United States Patent [19]

Lehmann et al.

[11] Patent Number: 4,935,753

[45] Date of Patent: Jun. 19, 1990

[54] APPARATUS FOR THE CLEANING AND SEALING OF THE NOZZLE SURFACE OF AN INK HEAD

[75] Inventors: Manfred Lehmann, Puchheim; Heinz Lehna, Rosenheim; Werner Götz, München, all of Fed. Rep. of Germany

[73] Assignee: Siemens Aktiengesellschaft, Berlin and Munich, Fed. Rep. of Germany

[21] Appl. No.: 425,215

[22] PCT Filed: Mar. 15, 1988

[86] PCT No.: PCT/DE88/00155

§ 371 Date: Oct. 5, 1989

§ 102(e) Date: Oct. 5, 1989

[87] PCT Pub. No.: WO88/08370

PCT Pub. Date: Nov. 3, 1988

[30] Foreign Application Priority Data

Apr. 24, 1987 [DE] Fed. Rep. of Germany ....... 3713794

[51] Int. Cl.[5] ............................................ G01D 15/18

[52] U.S. Cl. ............................................... 346/140 R

[58] Field of Search ............... 346/75, 140 IJ, 140 PD

[56] References Cited

U.S. PATENT DOCUMENTS

| | | | |
|---|---|---|---|
| 4,253,103 | 2/1981 | Heinzl et al. | 346/140 R |
| 4,300,145 | 11/1981 | van Raamsdonk | 346/140 R |
| 4,369,456 | 1/1983 | Cruz-Uribe et al. | 346/140 R |
| 4,500,894 | 2/1985 | Kirner | 346/140 R |

FOREIGN PATENT DOCUMENTS

| | | | |
|---|---|---|---|
| 57-34969 | 2/1982 | Japan | 346/140 R |
| 59-14964 | 1/1984 | Japan | 346/140 R |
| 59-45161 | 3/1984 | Japan | 346/140 R |
| 59-45162 | 3/1984 | Japan | 346/140 R |
| 60-30347 | 2/1985 | Japan | 346/140 R |

*Primary Examiner*—George H. Miller, Jr.

*Attorney, Agent, or Firm*—Jeffrey P. Morris

[57] ABSTRACT

The sealing and cleaning apparatus for an ink head consists of an electromotively driven endless band, on which two wedge-shaped wiping lips are arranged. For cleaning and sealing, the nozzle head is brough a close distance in front of the endless band, a surface of the endless band not provided with wiping lips serving as spraying surface for the squirting-out of the ink head. A cleaning device of wiping edge or cleaning roller removes the ink on the endless band. For covering in breaks in recording, the endless band has, furthermore, a depression formed by bulges, which is brough into contact in front of the nozzle plate or covering. For sealing, a convexly formed flexible pad, which is arranged between the endless belt, is pressed by means of a pressure-applying device against the endless band and cosequently against the nozzle plate. Due to the convex form, no air entrapment can occur in the region of the nozzle plate.

9 Claims, 2 Drawing Sheets

APPARATUS FOR THE CLEANING AND SEALING OF THE NOZZLE SURFACE OF AN INK HEAD

Figure 1:
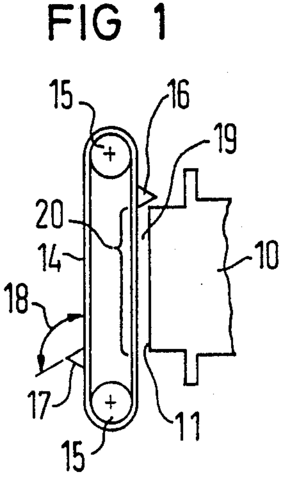

The invention relates to an apparatus for the cleaning and sealing of the nozzle surface on an ink head, according to the preamble of patent claim 1.

For the troublefree operation of ink printers, in which ink droplets are ejected from small nozzle orifices which are arranged, for example, in nozzle plates, it is necessary to keep the nozzle surface clean at all times, since dust particles, for example from the paper, or ink residues in the nozzle region can lead to skewed spraying or complete failure of the nozzles.

During cleaning of the nozzle surfaces, it must be ensured that the spraying function of the nozzles is maintained, for which reason air or dirt must not be forced into the small nozzle orifices in each cleaning operation.

If different-colored inks from neighboring rows of nozzles are ejected in ink printers, ink mixings due to ink residues on the nozzle surfaces, which could flow into the nozzle ducts, must not occur.

Furthermore, a drying-up of the nozzles during breaks in recording must be avoided and the nozzle orifices must be sealed during transportation, so that no ink can escape.

It is known from German Patent Specification 2,610,518 to clean the ink head and, in particular, the nozzle surfaces by the ink pressure briefly being increased manually and by the dirt particles being flushed away by the ink discharged at the nozzle surface.

The high ink consumption and the inadequate effect in the case of firmly adhering dirt are disadvantageous.

Other known cleaning apparatuses (German Offenlegungsschrift 3,207,072) use a pivotally arranged plate, which is moved back and forth with one edge over the nozzle surface.

In the case of plates which are taken flat over the nozzle plates, occasional air bubbles may, however, be forced into the nozzle orifices. Furthermore, it is not ensured that the dirt particles are wiped away from the nozzle plate.

Also known, from German Offenlegungsschrift 2,919,727, is an apparatus for the sealing of the nozzle surface on an ink recording head, in which a motor-driven flexible endless band is provided which lies in contact with the nozzle surface.

Such a contacting endless flexible band has the disadvantage that, under certain circumstances, dirt adhering to the nozzle surface is not removed but only spread and disturbances in the recording operation ensue. Furthermore, due to the tightly contacting band, air bubbles may be forced into the nozzle orifices during rotation.

The object of the invention is to design an apparatus for the cleaning and sealing of the nozzle surface on an ink head in such a way that the disadvantageous effects described at the beginning do not occur and consequently the operational reliability of the ink head is enhanced.

This object is achieved in the case of an apparatus of the type mentioned at the beginning according to the defining part of the first patent claim.

Advantageous embodiments of the invention are characterised in the subclaims.

By the arrangement of wiping lips, which are of such a wedge-shaped design that they cannot wrap around each other, and which extend over the width of all nozzle rows, the nozzle surface can be cleaned of adhering dirt absolutely reliably without air being forced into the nozzles during cleaning. Even firmly adhering dirt particles are reliably removed.

The necessary flexibility and compliance for producing the contact pressure of the wiping lips is brought about in an advantageous way by the flexure of the band itself.

The wedge-shaped lip form has the advantage that, with a defined angle, the lip can be moved towards and away from the orifices of the nozzle surface. This is of advantage in particular whenever an ink print head is operated with a vacuum, in which case an ink meniscus develops in the region of the orifices of the nozzle surface.

Furthermore, such a lip form has the important advantage that the lip can be cleaned down to the bottom on both sides. The cleaning of the lips is necessary in order not to transport ink and dirt back to the nozzle surface.

In this case, a simple advantageous mechanism, for example a sheet metal scraper or a cleaning roller or a cleaning screw, may serve for cleaning.

Since, in addition, the endless band has a region in which no wiping lips are arranged, the endless band may serve in this region as a plate for the squirting-out of the nozzles. Such a squirting-out is necessary in order to achieve an immediate true-color clean initial recording after lengthy breaks in recording. For this purpose, it is necessary to remove old, thickened ink, possibly even dirtied ink, from the nozzle orifices. For this purpose, this region is brought in front of the ink head and the ink is sprayed onto the endless band. The band is subsequently moved and cleaned.

In the case of an advantageous embodiment of the invention, the endless band may also be used as a cover guard against drying-up and dirtying in the breaks in recording. For this purpose, at the points at which there are no lips, the band has flexible bulges, which form a kind of depression which can be moved in front of the nozzle surface. The bulges bear resiliently against the nozzle surface and the depression thus formed forms a kind of protective shroud. For temperature and pressure equalization, openings to the environment are necessary, which may be designed for example as interruptions in the flexible bulges. As a result, a micro-climate preventing drying-up and dirtying is established at the nozzle orifices.

In order to be able to seal off the nozzle surfaces in the case of transportation or when there is a prolonged interruption in recording operation, a flexible pad is advantageously fitted inside the flexible band on a pivotally arranged lever. In order to seal the nozzle orifices, this flexible pad is pivoted against the likewise flexible band and together pressed in front of the nozzles. A cleaning of the nozzle surface, by wiping off, undertaken before the application of pressure, is of advantage.

Since it is virtually impossible to place a level plate onto a moist unlevel plate, namely the nozzle plate, without the effect (sic) of air bubbles, this pressure pad is of a curved design, at least in one direction. As a result, a linear contact or—in the case of curvature in two directions—a punctiform contact is initially produced between band and nozzle plate. With greater applied pressure, this contact becomes the surface which seals off the nozzles, air between the band and nozzle plate being forced away to the side, without it being possible for air to be forced into the nozzles.

Instead of the flexible pad which acts behind the endless band, it is also possible to design the flexible pad as flat and to arrange a correspondingly designed surface on the endless band.

Figure 2:
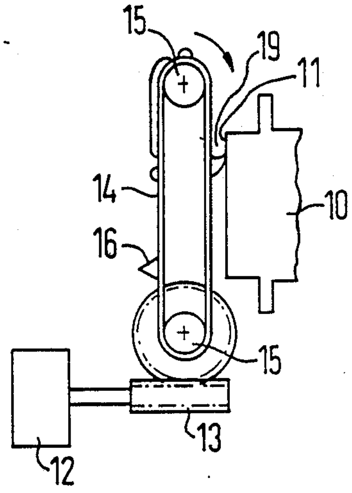
Figure 3:
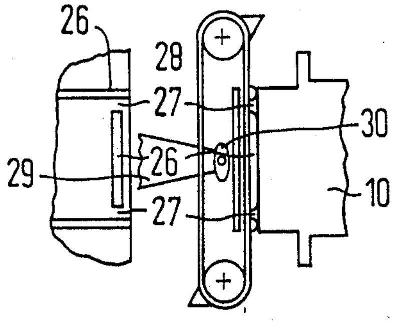
Figure 4:
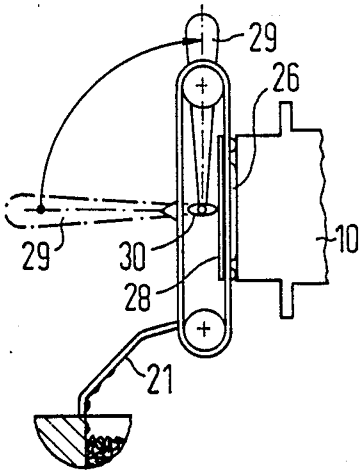
Figure 5:
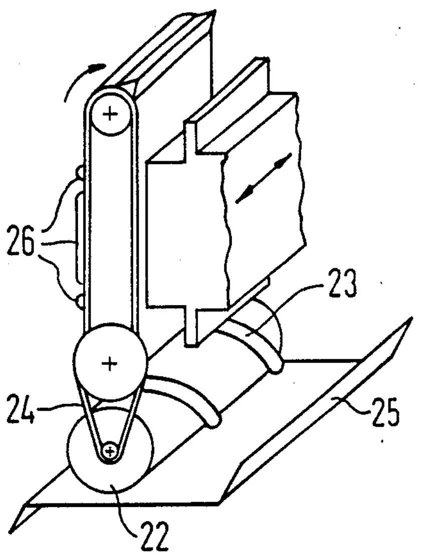
Figure 6:
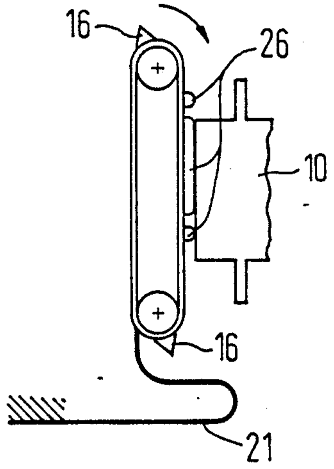

Embodiments of the invention are described in more detail below by way of example and represented in the drawings in which FIG. 1 shows a diagrammatic representation of the covering and cleaning apparatus for an ink head, FIG. 2 shows a diagrammatic representation of the covering and cleaning apparatus with an assigned electromotive drive, FIG. 3 shows a diagrammatic representation of the depressed region, designed like a protective shroud, the left-hand part-drawing of FIG. 3 representing a cut-out of the region with the bulges forming the depression, FIG. 4 shows a diagrammatic representation of the pressure-applying mechanism for the endless band, FIG. 5 shows a diagrammatic perspective representation of the cleaning device for an ink head with assigned band cleaning device in the form of a cleaning roller and FIG. 6 shows a diagrammatic representation of a band cleaning device for the endless band with a flexible metal wiping edge.

In an ink printer, not represented here in detail, an ink print head 10 is arranged, which in recording operation is moved line-by-line along a recording carrier. The ink print head 10 contains a plurality of rows of nozzles, which are arranged in a usual way on a nozzle plate 11, the nozzle plate 11 being flat in the discharge area.

In front of the ink print head there is a motor-driven cleaning and covering device for the ink head, in which arrangement, in the exemplary embodiment represented, the covering and cleaning apparatus is arranged fixedly on the side edge of the printing area of the printer and, for cleaning, the ink print head is brought via the printer carriage into the region of this cleaning device. It is, however, also conceivable to assign the cleaning and covering device directly to the print head and, if appropriate, to make it of a movable design, so that in printing operation the cleaning device can be pivoted away from the print head or the print head can be displaced laterally with respect to the cleaning device.

The cleaning device represented in particular in FIGS. 1 and 2 consists of a rotating endless band 14 of flexible material, for example rubber or elastomer, which is individually driven via an electric motor 12 with assigned gear unit and is guided by two rollers 15 and the width of which is slightly larger than the width of the nozzle surface. Two wiping lips 16, of wedge-shaped design, are arranged on the endless band 14. These wiping lips have an approximately triangular cross-section, it being possible for the angle at the front edge 17 to be different to the angle at the rear edge 18, so that obliquely-lying triangle-shaped lips can form. What is essential here is that the triangle-shaped wiping lips are fastened on the endless band 14 or are formed as a protuberance of the endless band in such a way that they cannot wrap around each other in the wiping operation.

The endless band 14 with the wiping lips 16 is then arranged at such a distance 19 just in front of the nozzle plate 11 that the wiping lips 16 can reliably brush over the nozzle plate in the cleaning operation. The flexibility and compliance for producing the contact pressure necessary for the wiping-off is produced essentially in this case by the flexure of this band.

With ink print heads, there is the risk after lengthy breaks in recording that the ink thickens in the region of the nozzle orifices Therefore, it is necessary—in order to achieve an immediate true-color printed image after resumption of the printing operation—to remove this thickened ink—or possibly even dirtied ink, from the nozzle orifices For this purpose, it is usual to squirt out the nozzles in the cleaning station.

In order to make this squirting-out easily possible, a region 20 which is free of wiping lips and which serves for the squirting-out as a collecting surface (plate) for the ink droplets during squirting-out is provided in the device represented. The ink thus sprayed onto the endless band is removed with the aid of a cleaning device (FIGS. 5, 6). In the simplest form, this cleaning device may consist of a resilient sheet metal scraper 21, which is fixed on the housing, wipes off the ink and feeds it to a collecting container (not represented here).

In the case of the exemplary embodiment according to FIG. 5, the cleaning device consists of a roller 22, which has wiping lips 23, arranged spirally on its circumference, and which is driven for example via a belt 24 by the endless band 14. In this case, the belt 24 at the same time fulfills a certain pressure-applying function for the roller 22 against the endless band 14.

In the operation of the endless band, the ink adhering to the endless band 14 is wiped off by means of the roller 22 with the wiping lips 23 arranged thereupon and is transported backwards or forwards, depending on the direction of rotation and slope of the wiping lips, to a collecting plate 25. The collecting plate may be provided with an ink collecting device or else the ink may be sucked off by means of a device not represented here.

In order to prevent a drying-up and dirtying of the nozzle surfaces of the ink print head 10 during breaks in recording, in a further area free of wiping lips, the endless band has flexible bulges 26, which form a kind of depression on the endless band 14. This depression, which acts as a protective shroud, is moved in breaks in the recording in front of the nozzle plate 11 and flexibly makes contact with the latter (FIG. 3). In this case, the bulges 26 are arranged in such a way that they embrace the region of the recording nozzles in the sealing state. However, in order to be able to ensure a pressure and temperature equalization with respect to the environment, the bulges 26 are arranged in such a way that they leave openings 27 clear.

Instead of the sealing bulges, it is also possible to provide a corresponding protective shroud-like depression in the endless band itself. What is essential, however, is that, after position (sic) of this "protective shroud" in front of the nozzle orifices, there develops in the region of the protective shroud a kind of micro-climate, which prevents a drying-out and dirtying of the nozzle plate in breaks in recording.

If the printing operation is interrupted for a very long time or if the printer is transported, it is necessary to seal off the nozzle plate 11. For this purpose, a pressure plate is arranged displaceably by means of an actuating device inside (FIG. 4) the endless band 14. In order to seal the nozzle orifices, this pressure plate, designed for example as flexible pad 28, is pressed by means of an actuating device of lever 29 with associated operating cam 30 against the band and consequently the endless band 14 is pressed with its flat surface, for example the squirting-region 20, onto the nozzle plate 11 for sealing. This sealing takes place after the nozzle plate 11 has previously been cleaned in a cleaning operation.

Since it is virtually impossible to place a level plate onto a moist unlevel plate, namely the nozzle plate, without the entrapment of air pockets, the pressure pad (pressure plate) 28 is of a curved design, at least in one direction. As a result, a linear contact (in the case of curvature of the pressure pad 28 in two directions: punctiform contact) is initially produced between endless band 14 and nozzle plate 11 during the application of pressure. With further applied pressure, a kind of rolling away ensues and the linear or punctiform contact becomes the pressure-applying surface, which seals off the nozzles. By this rolling-away operation, no air is entrapped and consequently no air is forced into the nozzles during sealing.

Instead of a convexly formed pressure pad 28, it is also possible to use a flat pressure pad and to form a convex surface on the endless band 14. In any event, the contact pressure which is exerted here by the operating cam 30 must be dimensioned great enough that all nozzles are sealed in the pressed-into-contact state. In order to bring this about reliably, in the case of the mechanism represented of lever 29 and operating cam 30, the lever 29 is pivoted manually out of a horizontal initial position (FIG. 4, represented in broken lines) into a vertical operating position, the elliptically designed operating cam pressing the pressure plate 28 and consequently the bulges 26 against the nozzle plate 11.

In the case of an embodiment not represented here, the actuation of the flexible pad 28 may also take place by means of an electromagnet or an electric motor.

We claim:

1. Apparatus for cleaning and sealing the nozzle surface of an ink head (10) comprising:

(a) a motor-driven flexible endless band (14) being disposed a distance in front of said nozzle surface (11);

(b) said endless band (14) having wiping lips (16) of a triangular-shaped cross-section;

(c) said wiping lips (16) being fastened on one of their sides on said endless band (14) for brushing over said nozzle surface (11) with their front edges during movement of said endless band (14) and (d) means acting behind said endless band (14) for sealing-off of said nozzle surface (11), said means having a pressure surface (28) for pressing said endless band against said nozzle surface (11).

2. Apparatus according to claim 1, wherein said endless band (14) comprises a region (20) free of wiping lips (14) which, on demand, can be positioned in front of said nozzle surface (11) to serve as a collecting plate for the ink droplets for squirting-out said nozzles.

3. Apparatus according to claim 1, wherein said pressure surface, or any other surface arranged of said band, is designed in such a curved form that, when sealing-off, said endless band (14) initially makes punctiform or linear contact with said nozzle surface (11) and that by further increasing of the contact pressure (30), said band (14) is in surface contact with said nozzle surface (11).

4. Apparatus according to claim 1, wherein said endless band (14) comprises a depressed region, which can be positioned in front of said nozzle surface for protecting against drying-out according to a protective shroud and said depressed region being designed that a microclimate inhibiting the drying-out of said nozzle form in the depressed region.

5. Apparatus according to claim 4, wherein said depressed region is formed by bulges (26), limiting the region said bulges having air-pressure and temperature compensating openings (27).

6. Apparatus according to claim 1, wherein said endless band (14) is assigned a band cleaning device (21), designed to clean said endless band of adhering ink.

7. Apparatus according to claim 6, wherein said band cleaning device comprises a wiping edge flexibly in contact with said endless band (14).

8. Apparatus according to claim 7, wherein said wiping edge (23) is arranged spirally on said cleaning rollers (22).

9. Apparatus according to claim 6, wherein said band cleaning device comprises cleaning rollers (22) flexibly in contact with said endless band (14).

* * * * *